(12) United States Patent
Böhnke et al.

US012030979B2

(10) Patent No.: US 12,030,979 B2
(45) Date of Patent: *Jul. 9, 2024

(54) TRANSLUCENT POLYURETHANE OR POLYISOCYANURATE FOAMS

(71) Applicant: Covestro Intellectual Property GMBH & CO. KG, Leverkusen (DE)

(72) Inventors: Lutz Böhnke, Overath (DE); Dirk Achten, Leverkusen (DE); Hans-Josef Laas, Odenthal (DE); Ann-Christin Bijlard, Bergisch Gladbach (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 469 days.

This patent is subject to a terminal disclaimer.

(21) Appl. No.: 17/282,697

(22) PCT Filed: Oct. 1, 2019

(86) PCT No.: PCT/EP2019/076617
§ 371 (c)(1),
(2) Date: Apr. 2, 2021

(87) PCT Pub. No.: WO2020/070140
PCT Pub. Date: Apr. 9, 2020

(65) Prior Publication Data
US 2021/0380753 A1    Dec. 9, 2021

(30) Foreign Application Priority Data

Oct. 2, 2018   (EP) ...................................... 18198126

(51) Int. Cl.
| | |
|---|---|
| C08G 18/72 | (2006.01) |
| B32B 5/18 | (2006.01) |
| B32B 17/06 | (2006.01) |
| B32B 27/06 | (2006.01) |
| B32B 27/30 | (2006.01) |
| B32B 27/36 | (2006.01) |
| C08G 18/22 | (2006.01) |
| C08G 18/24 | (2006.01) |
| C08G 18/32 | (2006.01) |
| C08G 18/48 | (2006.01) |
| C08G 18/66 | (2006.01) |
| C08G 18/73 | (2006.01) |
| C08G 18/76 | (2006.01) |

(Continued)

(52) U.S. Cl.
CPC .............. *C08G 18/722* (2013.01); *B32B 5/18* (2013.01); *B32B 17/066* (2013.01);
(Continued)

(58) Field of Classification Search
CPC ....... B32B 5/18; B32B 17/066; B32B 27/065; B32B 27/308; B32B 27/365; B32B 2250/03; B32B 2266/0278; B32B 2266/08; B32B 2307/412; B32B 2307/414; B32B 2419/04; B32B 2605/00; B32B 2607/00; C08G 18/225; C08G 18/246; C08G 18/3206; C08G 18/4829; C08G 18/6674; C08G 18/722; C08G 18/724; C08G 18/73; C08G 18/7614; C08G 2101/00;
(Continued)

(56) References Cited

U.S. PATENT DOCUMENTS

| | | | |
|---|---|---|---|
| 3,645,979 A | 2/1972 | Liebsch et al. | |
| 3,965,057 A * | 6/1976 | Ammons | ............. C08G 18/664 524/133 |

(Continued)

FOREIGN PATENT DOCUMENTS

| | | |
|---|---|---|
| DE | 102005042235 A1 | 3/2007 |
| EP | 0010589 A1 | 5/1980 |

(Continued)

OTHER PUBLICATIONS

International Preliminary Report on Patentability received for PCT Patent Application No. PCT/EP2019/076617, dated Apr. 15, 2021, 14 pages. (7 pages of English Translation and 7 pages of Original Document).

(Continued)

*Primary Examiner* — John M Cooney
(74) *Attorney, Agent, or Firm* — The Webb Law Firm

(57) ABSTRACT

The present invention relates to a process for producing translucent polyurethane and polyisocyanurate foams by reaction of a component A, comprising A1 at least one polyol reactive with component B; A2 optionally at least one amine; A3 water and optionally formic acid or at least one physical blowing agent or mixtures thereof; A4 at least one foam stabilizer; A5 optionally auxiliary and/or additive substances; A6 optionally at least one flame retardant; A7 at least one catalyst; and a component B, comprising B1 at least one aliphatic or cycloaliphatic polyisocyanate component or a combination thereof; and B2 optionally at least one hydrophilized isocyanate; and B3 more than or equal to 10 parts by weight and up to 70 parts by weight of an aromatic polyisocyanate component, wherein the parts by weight of B3 are based on the sum of the parts by weight of B1 to B3 which are normalized to 100 parts by weight. The invention is characterized in that the reaction of component A with component B is carried out at an isocyanate index of at least 150, wherein the obtained translucent polyurethane and polyisocyanurate foams have a light transmission according to EN ISO 13468-2:2006 of at least 10% and a haze of at least 70%, determined according to ASTM D1003-13, in each case measured at a layer thickness of 20 mm. The present invention further relates to the polyurethane and polyisocyanurate foams obtained by the process and to the use thereof as a construction element, as a wall element, as a floor element, in buildings, in vehicles or lamps.

15 Claims, No Drawings

(51) Int. Cl.
  *C08J 9/00* (2006.01)
  *C08J 9/12* (2006.01)
  *C08K 5/521* (2006.01)
(52) U.S. Cl.
  CPC .......... *B32B 27/065* (2013.01); *B32B 27/308* (2013.01); *B32B 27/365* (2013.01); *C08G 18/225* (2013.01); *C08G 18/246* (2013.01); *C08G 18/3206* (2013.01); *C08G 18/4829* (2013.01); *C08G 18/6674* (2013.01); *C08G 18/724* (2013.01); *C08G 18/73* (2013.01); *C08G 18/7614* (2013.01); *C08J 9/0038* (2013.01); *C08J 9/0061* (2013.01); *C08J 9/125* (2013.01); *C08K 5/521* (2013.01); *B32B 2250/03* (2013.01); *B32B 2266/0278* (2013.01); *B32B 2266/08* (2013.01); *B32B 2307/412* (2013.01); *B32B 2307/414* (2013.01); *B32B 2419/04* (2013.01); *B32B 2605/00* (2013.01); *B32B 2607/00* (2013.01); *C08G 2110/0083* (2021.01); *C08J 2201/022* (2013.01); *C08J 2203/10* (2013.01); *C08J 2375/08* (2013.01)
(58) Field of Classification Search
  CPC ..... C08G 2110/0025; C08G 2110/0083; C08J 9/0038; C08J 9/0061; C08J 9/125; C08J 2201/022; C08J 2203/10; C08J 2375/04; C08J 2375/08; C08K 5/521
  See application file for complete search history.

(56) References Cited

U.S. PATENT DOCUMENTS

| 4,010,311 A * | 3/1977 | Lewis | C08G 18/4238 |
| | | | 428/424.2 |
| 11,447,594 B2 * | 9/2022 | Böhnke | C08G 18/3206 |
| 2009/0075030 A1 * | 3/2009 | Kokko | C08G 18/5024 |
| | | | 521/137 |

FOREIGN PATENT DOCUMENTS

| EP | 0047452 A1 | 3/1982 |
| EP | 0629607 A2 | 12/1994 |
| WO | 2016/146579 A1 | 9/2016 |

OTHER PUBLICATIONS

International Search Report and Written Opinion received for PCT Patent Application No. PCT/EP2019/076617, dated Oct. 22, 2019, 16 pages. (7 pages of English Translation and 9 pages of Original Document).

* cited by examiner

TRANSLUCENT POLYURETHANE OR POLYISOCYANURATE FOAMS

CROSS-REFERENCE TO RELATED APPLICATIONS

This application is a national stage application (under 35 U.S.C. § 371) of PCT/EP2019/076617, filed Oct. 1, 2019, which claims benefit of European Application No. 18198126.7, filed Oct. 2, 2018, both of which are incorporated herein by reference in their entirety.

The present invention relates to translucent, preferably predominantly closed-cell and lightfast, polyurethane or polyisocyanurate foams which have a high light transmission and are therefore suitable for example for the production of translucent constructional elements.

PRIOR ART

Polyisocyanate-based rigid foams as an interlayer for sandwich structures (molded sandwich sheets) and the use thereof for producing constructional elements are known per se. Translucent foam sheets as wall and ceiling sheets have also been described previously, for example DE 10 2005 042 235 A1. However, translucency was not achieved by the foams themselves being translucent but rather by light-conducting fibers being incorporated. The polyurethane and polyisocyanurate foams known from the prior art are, however, not translucent per se.

Polyurethane and polyisocyanurate foams are typically used for thermal insulation. Translucent foams having good light permeability and good thermal insulation characteristics are of interest as materials both for the construction industry and in the interiors and home design sectors. Room-dividing elements having translucent but not transparent properties coupled with sound insulation and thermal insulation and based on organic weathering-stable and highly crosslinked plastics have not yet been described but would satisfy various requirements in a novel combination such as weathering stability, insulation, light permeability, optical screening and color stability.

Thermoplastic multiwall sheets based on polymethyl methacrylate and polycarbonate which may also be made to be transparent are sometimes used for this purpose. However, the process of producing multiwall sheets does not allow for the direct production of closed cellular structures, as a result of which yellowing, algal contamination and other effects caused by moisture migration can never be ruled out entirely. In addition, high-quality insulation and optical screening are realized only to an extent and achieved only at great cost and complexity, for example by filling the multiwall sheets with silica-based aerogels. Here too, water absorption and volume stability of the filled component are critical.

Translucent constructional elements based on silica aerogels are also very costly and complex to produce.

It is accordingly an object of the present invention to provide a polyurethane and polyisocyanurate foam having high translucency. These foams shall preferably be very largely colorless and thus colorable if required and also thermally stable. It is a further object of the present invention to provide an efficient process for producing translucent, insulating construction materials which satisfy the abovementioned requirements and overcome the abovementioned disadvantages.

The objects were achieved by a process for producing translucent polyurethane and polyisocyanurate foams by reaction of a component A comprising or consisting of
- A1 at least one polyol reactive with the component B;
- A2 optionally at least one amine;
- A3 water and optionally formic acid or at least one physical blowing agent or mixtures thereof;
- A4 at least one foam stabilizer
- A5 optionally auxiliary and/or additive substances;
- A6 optionally at least one flame retardant;
- A7 at least one catalyst;

and a component B whose content of aromatic polyisocyanates is not less than 5% by weight and not more than 70% by weight, comprising
- B1 at least one aliphatic or cycloaliphatic polyisocyanate component or a combination thereof;
- B2 optionally at least one hydrophilized isocyanate; and
- B3 greater than or equal to 10 parts by weight and up to 70 parts by weight, preferably up to 50 parts by weight and very particularly preferably up to 40 parts by weight and especially preferably up to 30 parts by weight of an aromatic polyisocyanate component, wherein the parts by weight of B3 are based on the sum of the parts by weight of B1 to B3 which are normalized to 100 parts by weight, characterized in that the reaction of the component A with the component B is performed at an isocyanate index of at least 200, preferably of at least 250 and particularly preferably of at least 300, wherein substantially no gaseous nucleating agents introduced by the mixing process are present during the reaction and wherein the obtained translucent polyurethane and polyisocyanurate foams have a light transmission according to EN ISO 13468-2:2006 of at least 10% and a haze of at least 70% determined according to ASTM D1003-13 in each case measured at a thickness of 20 mm.

It has now been found that, surprisingly, the inventive foams based on polyurethane and polyisocyanurate foams produced from the specific composition of the present invention have a higher light transmission, in particular when the individual components are preferably mixed in an ideally bubble-free manner and foamed with a chemical blowing agent. The incorporation of gases, in particular of air, is preferably to be avoided here. The light transmission of the formulations according to the invention tends to be higher when the reaction mixture preferably has the lowest possible turbidity according to DIN EN ISO 7027 before use in the blowing reaction. Since turbidity is determinatively caused by scattering of light by microbubbles, it can be used as a measure for the microbubbles formed by incorporated air/gas.

When in a preferred embodiment the components are mixed in this way the foams according to the invention based on polyurethane and polyisocyanurate foams have a particularly high light transmission of at least 10% measured at a thickness of 20 mm combined with good insulation properties, namely a thermal conductivity preferably of less than 100 mW/(m*K). In addition to the good translucency and good insulation properties the foams according to the invention moreover show a very good thermal stability and a good flame retardancy which is advantageous for use in the construction sector for example.

A translucent foam is to be understood as meaning a foam which in a range from 400 nm to 800 nm has a light transmission of at least 10% determined according to EN ISO 13468-2:2006 at a thickness of 20 mm, preferably at least 20%. The obtained foam also has a haze (=100*diffuse transmission/total transmission) of at least 70% determined according to ASTM D1003-13 at a thickness of 20 mm, preferably of at least 90%, more preferably of at least 95%, most preferably of at least 99%.

A polyurethane/polyisocyanurate foam is to be understood as meaning a foam where the curing of the liquid starting formulation containing isocyanates and polyols with an index 150, preferably 200, particularly preferably 300, results in a crosslinked polymer in foam form. The reaction preferably proceeds to a large extent via a trimerization reaction of the isocyanate function, thus forming predominantly polyisocyanurates.

The index indicates NCO-reactive equivalents relative to the active H functions, usually OH or NH equivalents (Kunststoffhandbuch 7, Polyurethane, 1983, p. 12).

The index is calculated according to the following equation:

$$\text{Index} = \frac{100 \cdot \text{NCO\_Äquivalente}}{\text{OH\_Äquivalente}}$$

In the present invention the terms "substantially no" and "substantially free from" are to be understood as meaning that based on the particular system, mixture or the particular component the particular feature is present in an amount less than 2%, preferably in an amount less than 1%, more preferably in an amount less than 0.5%, most preferably in an amount less than 0.1% or is not present at all.

Commercially available polyurethane and polyisocyanurate foams typically have a translucency of less than 10% measured at a foam thickness of 20 mm. Without wishing to be bound to a particular theory it is assumed that on account of the small cell sizes compared to the translucent foams and on account of the many cell walls light is scattered strongly, thus causing light transmission to fall sharply due to strong reflection of the incident light at the surface. The cell wall thicknesses of foams known in the prior art are typically 0.01 to 0.04 mm. Conventional polyurethane and polyisocyanurate foams based on aromatic di- and polyisocyanates moreover show a high tendency for weathering-induced yellowing which in turn reduces translucency over time and negatively affects the appearance of the foams (yellowing).

Polyol Component A1

The composition according to the invention contains at least one polyol A1 that is reactive with the component B and optionally at least one amine A2. Preferably employed polyols include diols and triols. Suitable polyols preferably have a boiling point at 1 bar of greater than 150° C.

Examples of preferred diols are ethylene glycol, butylene glycol, diethylene glycol, triethylene glycol, polyalkylene glycols such as polyethylene glycol, and also 1,2-propanediol, 1,3-propanediol, 1,3-butanediol, 1,4-butanediol, 1,6-hexanediol and isomers, neopentyl glycol or neopentyl glycol hydroxypivalate. Also employable in addition are polyols such as trimethylolpropane, glycerol, erythritol, pentaerythritol, trimethylolbenzene or trishydroxyethyl isocyanurate. Glycerol, ethylene glycol, diethylene glycol, propylene glycol, butanediols, neopentyl glycol, pentanols and trimethylolpropane are particularly preferred. Greatest preference is given to diethylene glycol, trimethylolpropane and glycerol.

In addition to the pure polyols and di- and triols it is also possible to employ carbonate diols, polyester polyols and polyether polyols to a small extent. The latter have, however, a lower light and UV stability and are therefore less suitable, especially when the obtained translucent foam is not protected by UV-absorbing transparent materials. In addition, the poorer water solubility of such polyols entails greater bubble formation which in the process according to the invention tends to result in finer-celled foams.

Component A2

The component A may optionally contain amines, preferably secondary and/or tertiary amines such as diethanolamine and/or triethanolamine and/or amine-started polyethers. Suitable amines preferably have a boiling point at 1 bar of greater than 200° C.

Component A3

Chemical blowing agents are known to those skilled in the field of foams.

The amount of chemical blowing agent A3 employed depends on the desired density of the foam. The component A3 contains water and in a preferred embodiment also formic acid.

In preferred embodiments physical blowing agents may also be used in addition to water. Suitable physical blowing agents include for example halogenated hydrocarbons (in particular low-flammable or nonflammable low molecular weight fluorohydrocarbons such as HFC-254fa (1,1,1,3,3-pentafluoropropane), HFC-365mfc (1,1,1,3,3-pentafluorobutane), esters (in particular methyl formate, ethyl formate, methyl acetate and ethyl acetate or mixtures thereof), gases such as carbon, nitrogen and hydrocarbons (in particular c-pentane, n-pentane, i-pentane, all isomers of hexane).

In a further preferred embodiment the component A3 contains water and at least one physical blowing agent, preferably at least one hydrocarbon, in particular c-pentane.

Component A4

At least one component selected from surface-active additives, in particular silicone surfactants and more preferably siloxane-polyoxyalkylene copolymers and polydimethylsiloxane-polyoxyalkylene copolymers.

Component A5

Auxiliary and/or additive substances for polyurethane and polyisocyanurate foams are known to those skilled in the field and may optionally be present. In preferred embodiments antioxidants and heat stabilizers may be employed for protection of the foams. Antioxidants are chemical compounds which prevent or delay free-radical degradation and decomposition. These include free radical scavengers having reactive H atoms such as sterically hindered phenols (commercially available as Irganox 1135, for example) or they decompose hydroperoxides (thermooxidative decomposition), for example thioesters (commercially available as PS800). In preferred embodiments light stabilizers may also be present. These are for example compounds from the group of benzotriazoles (commercially available under the trade names Tinuvin 213, Tinuvin 326 for example) and the so-called HALS (hindered amine light stabilizers, commercially available under the trade name Tinuvin 765 for example). Furthermore, commercially available synergistic mixtures such as for example Tinuvin B75, consisting of 20% Irganox 1135, 40% Tinuvin 571 and 40% Tinuvin 765, may also be present. A5 preferably contains at least one component selected from initiators, additives, pigments, fillers and/or a combination thereof.

Component A6

The component A may optionally contain a component A6, namely at least one flame retardant. The amount of A6 depends on the desired fire characteristics of the foam and is known to those skilled in the art. Preferably employed flame retardants are colorless and non-coloring flame retardants, more preferably phosphorus-containing compounds, more preferably phosphates, particularly preferably triethyl phosphate.

Catalysts A7

The formation of foams from polyol/water mixtures, polyol/water/formic acid mixtures and isocyanate/polyisocyanate requires the use of suitable catalysts. These are known to those skilled in the art.

Suitable catalysts are for example ammonium formate, ammonium acetate, ammonium octanoate, tin(II) acetate, tin(II) octoate, tin(II) ethylhexoate, tin(II) laurate, dibutyltin diacetate, dibutyltin dilaurate, dibutyltin maleate, dioctyltin diacetate, sodium acetate, sodium octoate, sodium ethylhexoate, potassium formate, potassium acetate, potassium ethylhexanoate, potassium octanoate and mixtures thereof. In order to accelerate the blowing reaction (reaction between water and optionally formic acid and isocyanate) it is also possible to additionally employ aminic catalysts, for example 1,8-diazabicyclo[5.4.0]undec-7-ene (DBU) etc. EP 0629607 A2 describes for example the production of tertiary amino-containing compounds and the use thereof as catalysts. It is preferable to employ catalysts based on potassium salts of organic acids. Potassium acetate and potassium ethylhexanoate are particularly preferred. It is preferable when the blowing reaction is accelerated by synergistic amine catalysts such as for example DBU.

Polyisocyanate Component B (Also Referred to as Component B)

Starting compounds for the polyisocyanate component B for the process according to the invention are B1 at least one aliphatic or cycloaliphatic polyisocyanate component or a combination thereof, optionally B2 at least one hydrophilized isocyanate and B3 at least one aromatic polyisocyanate component comprising not less than 10 parts by weight and up to 70 parts by weight, preferably up to 50 parts by weight and very particularly preferably up to 40 parts by weight, wherein the parts by weight of B3 are based on the sum of the parts by weight of B1 to B3 which are standardized to 100 parts by weight.

The aromatic polyisocyanate component B3 is the entirety of all polyisocyanates which contain or consist of aromatic polyisocyanates. These may be monomeric aromatic di- and triisocyanates. However, they may also be oligomeric polyisocyanates obtained by oligomerization of monomeric isocyanates by the known processes. Suitable reactants for such oligomerizations include compositions consisting exclusively of aromatic diisocyanates and optionally triisocyanates. However, admixtures of aliphatic and/or cycloaliphatic di- or triisocyanates may also be present. Such admixtures are especially preferred to achieve the isocyanate content of not more than 25% by weight characterized as preferred hereinbelow.

The use of the above-described polyisocyanate components B3 results in polyisocyanate components B having a total content of aromatic polyisocyanates of not less than 5% by weight and not more than 70% by weight, preferably not less than 10% by weight and not more than 70% by weight, more preferably not less than 20% by weight and not more than 70% by weight, yet more preferably not less than 20% by weight and not more than 55% by weight and most preferably not less than 20% by weight and not more than 40% by weight based on the total weight of polyisocyanate component B. When an oligomeric polyisocyanate component B3 is employed the total content of aromatic isocyanates may differ from the quantity fraction of the polyisocyanate component B3. This is the case when using oligomeric polyisocyanate components B3 which contain not only aromatic diisocyanates but also aliphatic or cycloaliphatic diisocyanates as synthesis components.

Such isocyanates are typically produced by phosgenation but may also be produced by a phosgene-free route, for example by urethane cleavage. In a preferred case the products of a specific trimerization of diisocyanates are employed as starting compounds liquid at room temperature (23° C.). Said diisocyanates and the processes for producing them are described for example in EP 0010589 A1 and EP 0047452 A1. Alternative synthetic routes are for example the catalytic carbonylation of nitro compounds or amines or the reaction of primary amines with di-tert-butyl dicarbonate (Diboc) in the presence of 4-(dimethylamino)pyridine (DMAP).

Customary polyurethane and polyisocyanurate foams for use as insulation and sealing materials are typically produced on the basis of mixtures of 4,4'-, 2,4'- and 2,2'-diphenylmethane diisocyanates (MDI) and polyphenylpolymethylene polyisocyanates (p-MDI). However, such foams are neither translucent nor colorfast nor lightfast and have a propensity for severe discoloration. This initial yellowing then often transitions into a brownish discoloration. Commercially available polyurethane and polyisocyanurate foams based on aromatic isocyanates (having a proportion of more than 20% by weight of the total isocyanate and an index below 200, i.e. a considerable proportion of the aromatic isocyanates is present in the product in the form of the reaction product with an alcohol or an amine as a urethane or urea) are thus per se not suitable for production of translucent foams.

According to the present invention such aromatic isocyanates may surprisingly be used for production of color-stable and transparent foams in a blend with up to 60% aliphatic isocyanates at high indices of at least 200, preferably of at least 300 and particularly preferably of at least 500. As indicated hereinabove the presence of urethane groups in the finished foam is undesirable. This is why constituents of the component B are preferably selected from polyisocyanates which have a low content of these groups and are preferably free thereof. All monomeric diisocyanates meet this requirement. When using oligomeric polyisocyanates preference is given to compounds whose combined content of urethane groups is low. The polyisocyanate component B in its entirety preferably has a combined content of urethane groups (—NH—CO—O—) of not more than 5.0% by weight, preferably of not more than 3.5% by weight, particularly preferably of not more than 2.5% by weight, based on their total weight.

The total content of water and NH groups in the formulation should preferably be selected such that urea groups (—NH—CO—NH—) in the finished foam account for not more than 4.5% by weight, preferably not more than 2.8% by weight, particularly preferably not more than 1.3% by weight, based on the total weight of the finished foam.

The number of hydroxyl groups is to be chosen such that urethane groups (—NH—CO—O—) in the finished foam account for not more than 6% weight, preferably not more than 4.5% by weight, particularly preferably not more than 3.5% by weight, based on the total weight of the finished foam.

The polyisocyanate component B preferably has a viscosity according to DIN EN ISO 3219:1994-10 at 23° C. of 5 to 30 000 mPas, more preferably of 200 to 25 000 mPas, most preferably of 800 to 22 500 mPas.

It is advantageous when at least 30% by weight, in particular 60% by weight, based on the total weight of B aliphatic polyisocyanates are used. Particular preference is given to isocyanurate-containing polyisocyanates based on 1,6-diisocyanatohexane (HDI) or 1,5-diisocyanatopentane (PDI) having an NCO content <25% and an average NCO functionality of >2.

In a particular embodiment, oligomeric polyisocyanates containing aromatic di- and/or triisocyanates may be used in a proportion of up to 70% by weight when in their production these were statistically co-trimerized with aliphatic isocyanates to afford oligomeric polyisocyanates having an isocyanate content of <25%. Isocyanurate-containing polyisocyanates based on 2,4-/2,6-toluene diisocyanate (2,4-TDI, 2,6-TDI) are particularly preferred. It is likewise also possible, but less preferable, to employ diphenylmethane 2,4'-diisocyanate and/or diphenylmethane 4,4'-diisocyanate. The abovementioned aromatic diisocyanates are preferably produced as mixed isocyanurates with HDI or PDI in order to achieve the abovementioned isocyanate content. Oligomers synthesized from TDI in conjunction with HDI and/or PDI are thus particularly preferred.

In a preferred embodiment hydrophilized isocyanurate-containing polyisocyanates B2 are used for compatibilization, in particular in the presence of polar, chemical blowing agents such as water and/or formic acid. In a preferred embodiment B2 is in at least 1 part by weight, preferably at least 3 parts by weight, more preferably at least 5 parts by weight, based on the sum of the parts by weight of B1 to B3 which are normalized to 100 parts by weight. In a further preferred embodiment B2 is present in 3 to 35 parts by weight, preferably in 5 to 15 parts by weight, more preferably in 8 to 12 parts by weight, based on the sum of the parts by weight of B1 to B3 which are normalized to 100 parts by weight. Covestro Deutschland AG markets such compounds under the name Bayhydur® for use as crosslinkers in the coatings industry. The commercially available hydrophilized isocyanate Bayhydur® 3100 having an NCO content of 17.4% by weight, an average NCO functionality of 3.2 (according to GPC), a content of monomeric HDI of not more than 0.1% by weight and a viscosity (23° C.) of 2800 mPas is suitable in particular and is an example of a hydrophilic isocyanurate-containing polyisocyanate based on 1,6-diisocyanatohexane (HDI). Other hydrophilic isocyanate-containing polyisocyanates from other manufacturers are also suitable here. Also possible is an in situ production of hydrophilized isocyanates before or during the foaming reaction by addition of suitable mono- or polyfunctional hydrophilic isocyanate-reactive compounds such as for example polyethers, polyesters and sulfonic acid-bearing compounds and other compounds known to those skilled in the art.

Particular preference is given to a polyisocyanate component B having a proportion of monomeric diisocyanates in the polyisocyanate composition B of not more than 50% by weight, advantageously of not more than 25% by weight and particularly advantageously of not more than 10% by weight in each case based on the total weight of the polyisocyanate component B. The reaction enthalpy of the trimerization reaction to afford polyisocyanates is very high at −75 kJ/mol NCO. This applies in particular to the production of polyisocyanurate foams since porous materials in general and foams in particular have a very low thermal conductivity, thus resulting in an adiabatic reaction regime which leads to a severe temperature increase and thus often to severe yellowing. A reaction proceeding from monomeric diisocyanates, particularly monomeric diisocyanates having a high isocyanate content of at least 50% (for example BDI, PDI, HDI, TIN), is therefore not preferred for large-volume foam bodies under the virtually adiabatic conditions prevailing therein but rather is preferred for example for use in double belt plants for producing panels or other applications where good temperature and reaction control is possible. The low-monomer polyisocyanate component B and the oligomeric polyisocyanates present therein are typically obtained by modifying simple aliphatic, cycloaliphatic, araliphatic and/or aromatic monomeric diisocyanates or mixtures of such monomeric diisocyanates. The production of polyisocyanurates, described in U.S. Pat. No. 3,645,979 A for example, is primarily described in the prior art for example as proceeding from liquid monomeric diisocyanates (for example stearyl diisocyanate, dodecyl diisocyanate, decyl diisocyanate, nonyl diisocyanate, octyl diisocyanate, hexamethylene diisocyanate (HDI), pentamethylene diisocyanate (PDI), isophorone diisocyanate (IPDI), 4,4'-diisocyanatodicyclohexylmethane ($H_{12}$MDI), toluene diisocyanate (TDI), diphenylmethane diisocyanates (4,4'-diphenylmethane diisocyanate, 2,4'-diphenylmethane diisocyanate, 2,2'-diphenylmethane diisocyanate) (MDI), naphthalene 1,5-diisocyanate (NDI), 2,5- and 2,6-bis(isocyanatomethyl)bicyclo [2.2.1]heptane (NBDI), 1,4-butane diisocyanate (BDI), of aliphatic and aromatic nature alike.

Preferred compounds for the polyisocyanate component B are those based on stearyl diisocyanate, dodecyl diisocyanate, decyl diisocyanate, nonyl diisocyanate, octyl diisocyanate, hexamethylene diisocyanate (HDI), pentamethylene diisocyanate (PDI), isophorone diisocyanate (IPDI), 4,4'-diisocyanatodicyclohexylmethane ($H_{12}$MDI), toluene diisocyanate (TDI), 2,5- and 2,6-bis(isocyanatomethyl)bicyclo [2.2.1]heptane (NBDI), 1,4-butane diisocyanate (BDI) and also blends with the diisocyanate precursors thereof and other compatible and co-soluble isocyanate-functional prepolymers such as uretdiones, biurets, ureas, asymmetric trimers, mixed trimers of different isocyanates and others which are generated in the production of trimeric isocyanurate compounds having a functionality of at least 2 and are known from the literature.

Isocyanurate-containing polyisocyanates based on 1,5-diisocyanatopentane (PDI) and/or based on 1,6-diisocyanatohexane (HDI) are particularly preferred. PDI polyisocyanate comprising isocyanurate groups, produced by catalytic trimerization of PDI by the method described in WO 2016/146579 for the polyisocyanate component A2). The reaction was deactivated at an NCO content of the crude mixture of 36.7% by addition of an equimolar amount of dibutyl phosphate, based on the amount of catalyst used, and further stirring for 30 minutes at 80° C. Subsequently, unconverted PDI was removed by thin-film distillation at a temperature of 140° C. and a pressure of 0.5 mbar. The PDI-based polyisocyanate has an NCO content of 21.8%, an NCO functionality of 3.5, a content of monomeric PDI of 0.09% and a viscosity of 9850 mPas (23° C.).

Likewise preferred is an isocyanurate-containing polyisocyanate based on 1,6-diisocyanatohexane (HDI) having an NCO content of 21.8% by weight, an average NCO functionality of 3.5 (according to GPC), a content of monomeric HDI of not more than 0.1% by weight and a viscosity of 3000 mPas (23° C.) or isocyanurate-containing polyisocyanate based on 1,6-diisocyanatohexane (HDI) having an NCO content of 21.7% by weight, an average NCO functionality of 3.1 (according to GPC), a content of monomeric HDI of not more than 0.1% by weight and a viscosity of 1200 mPas (23° C.) or isocyanurate-containing polyisocyanate based on 1,6-diisocyanatohexane (HDI) having an NCO content of 20.0% by weight, an average NCO functionality of 4.2 (according to GPC), a content of monomeric HDI of not more than 0.2% by weight and a viscosity of 22

700 mPas (20° C.). Likewise preferred is an isocyanurate-containing polyisocyanate based on 1,6-diisocyanatohexane (HDI) having an NCO content of 23.2% by weight, an average NCO functionality of 3.2 (according to GPC), a content of monomeric HDI of not more than 0.2% by weight and a viscosity of 1200 mPas (23° C.), an isocyanurate-containing polyisocyanate based on 1,6-diisocyanatohexane (HDI) having an NCO content of 20% by weight, an average NCO functionality of 4.2 (according to GPC), a content of monomeric HDI of less than 0.25% by weight and a viscosity of 16 000 mPas (23° C.), a hydrophilic isocyanurate-containing polyisocyanate based on 1,6-diisocyanatohexane (HDI) having an NCO content of 17.4% by weight, an average NCO functionality of 3.2 (according to GPC), a content of monomeric HDI of not more than 0.1% by weight and a viscosity of 2800 mPas (23° C.), an isocyanurate-containing polyisocyanate based on 1,6-diisocyanatohexane (HDI) having an NCO content of 21.7% by weight, an average NCO functionality of 3.5 (according to GPC), a content of monomeric HDI of not more than 0.1% by weight and a viscosity of 3000 mPas (23° C.) and an isocyanurate-containing polyisocyanate based on 1,5-diisocyanatopentane (PDI) having an NCO content of 21.5% by weight, an average NCO functionality of 3 (according to GPC), a content of monomeric PDI of less than 0.3% by weight and a viscosity of 9500 mPas (23° C.). An isocyanurate-containing polyisocyanate based on 2,4-toluene diisocyanate and 1,6-diisocyanatohexane having an NCO content of 24.4% by weight (calculated), an average NCO functionality of 3 and a viscosity <100 000 MPas at 23° C. is particularly preferred.

Unless otherwise stated the average NCO functionality of the component B is determined by gel permeation chromatography (GPC). Functionality is a term for the number of reactive groups per molecule, i.e. for the number of potential bonding points in the formation of a network. However, polyisocyanates as are formed for example in the trimerization of diisocyanates do not consist only of one defined type of molecule but rather contain a wide distribution of different molecules having different functionalities. The parameter reported for polyisocyanates is therefore the average functionality. The average functionality of polyisocyanates is unambiguously determined by the ratio of number-average molecular weight and equivalent weight and is generally calculated from the molecular weight distribution determined by gel permeation chromatography.

According to the invention the oligomeric polyisocyanates may in particular comprise uretdione, isocyanurate, allophanate, biuret, iminooxadiazinedione and/or oxadiazinetrione structures. Particular preference is given to polyisocyanates having proportions of isocyanurate groups of >10% by weight, very particularly preferably >20% by weight, in the polyisocyanate component B.

Irrespective of the underlying oligomeric structure (uretdione, isocyanurate, allophanate, biuret, iminooxadiazinedione and/or oxadiazinetrione structure) the polyisocyanate component B for use in the process according to the invention and/or the oligomeric polyisocyanates present therein preferably have an (average) NCO functionality of 2.0 to 6, preferably of 2.3 to 4.0.

Particularly preferred results are achieved when the polyisocyanate component B for use according to the invention has a content of isocyanate groups of 15% to 40% by weight, preferably of 20% to 30% by weight, in each case based on the total polyisocyanate composition B.

Suitable commercially available polyisocyanates are inter alia Desmodur® XP 2675, Desmodur® XP 2489, Desmodur® N3300, Desmodur® N3600, Desmodur® H, Desmodur® N3200, Bayhydur® 3100, Desmodur® N eco 7300, Desmodur® HL BA and Desmodur® HL EA and polyisocyanates obtainable by polymerization of Desmodur® H, Desmodur® I, Desmodur® W, Desmodur T100, Desmodur T80, Desmodur T65, Desmodur 44M Flakes, Desmodur 44M Liquid, Desmodur Vers. Prod. PU 1806—all commercially available from Covestro Deutschland AG.

Polyurethane or Polyisocyanurate Foams According to the Invention

In a preferred embodiment the foam thickness of the foam according to the invention perpendicular to the incident light has at least a multiplier of 3, preferably 5 and particularly preferably 10*the cell thickness based on the average cell diameter.

In a further preferred embodiment the foam according to the invention has a lambda value of less than 0.08, preferably less than 0.06, particularly preferably less than 0.05 W/(m*K), measured according to DIN 52616:1977-11.

In a further preferred embodiment the foam according to the invention has a crystalline proportion of less than 20%, preferably less than 10%, particularly preferably less than 2%. In a particularly preferred embodiment the obtained foams according to the invention contain crystalline proportions whose crystal sizes do not noticeably refract visible light.

General Production Process

Foaming processes are generally carried out either by chemical or physical means. In the production of PUR/PIR foams the employed components (A and B) are mixed either via a high pressure mixing or via a low pressure mixing (usually barbed stirrer). In the case of mixtures of different isocyanates these are preferably blended beforehand. The same applies to a mixture of the A components. In preferred embodiments of the prior art air is intentionally incorporated since the micro-airbubbles are nucleation centers and thus help to form a finer-celled foam as is desired for rigid insulation foams in particular.

In a preferred embodiment the foams according to the invention are obtained by a process according to the invention in which the reaction components are mixed in suitable mixing apparatuses while largely avoiding microbubbles preferably having a bubble diameter <0.5 mm. Microbubbles are preferably largely avoided and this is characterized for example by an optically transparent or translucent mixture in contrast to a milky turbid mixture. To this end the turbidity of the composition may be measured according to DIN EN ISO 7027 directly after mixing as an indicator. Without wishing to be bound to a particular theory it is thought that the fewer microbubbles are present in the reaction mixture after mixing the higher the light transmission will subsequently be. The microbubbles, which can act as condensation centers for the preferably chemical blowing agents, scatter the light and the foam formed therefrom has a lower light transmission.

It is possible to achieve high light transmissions with conventional production processes, i.e. using conventional mixing apparatuses/stirrers, when preferably very slowly reacting foam systems are used, i.e. the foams react only when the initially incorporated nucleating agent (seed cells), for example air, has largely, i.e. substantially, dissolved or the very small bubbles have coalesced to form larger bubbles (about >0.5 mm) and have ascended and been volatilized. A person skilled in the art is aware that the reaction rate of the foam systems may be controlled through the choice of suitable catalysts and blowing agents. However for economic use of the desired translucent and thermally insulating foams a curing time of <2 h, preferably <1 h, very preferably <30 min and very particularly preferably <15 min should be established.

Bubble-Free Production Process

In a preferred production process gaseous nucleating agents, here in particular air (so-called admixing air), are substantially excluded during mixing of the substances. The reaction components are therefore substantially free from these gaseous nucleating agents. According to the invention the absence of air or generally the absence of gaseous nucleating agents results in a markedly coarser-celled foam having a substantially greater light transmission. Fine-celled foams scatter light more strongly which is deleterious to light transmission.

The present invention relates in particular to the following aspects:

In a first aspect the invention relates to a process for producing translucent polyurethane and polyisocyanurate foams by reaction of a component A comprising, preferably consisting of, A1 at least one polyol reactive with the component B which preferably has a molecular weight <400 g/mol, more preferably <310 g/mol or <200 g/mol or <150 g/mol, and/or which is preferably at least one hydrophilic polyol, such as for example glycols and EO polyether polyols;

A2 optionally at least one amine;

A3 water optionally in the presence of formic acid or at least one physical blowing agent or mixtures thereof and preferably optionally in the presence of formic acid and/or physical blowing agents;

A4 at least one foam stabilizer such as for example silicone surfactants preferably from the group of siloxane-polyoxyalkylene copolymers and/or polydimethylsiloxane-polyoxyalkylene copolymers A5 optionally auxiliary and/or additive substances such as stabilizers, UV protectants, initiators, additives, pigments, fillers or a combination thereof;

A6 optionally at least one flame retardant, preferably colorless and non-discoloring flame retardants, more preferably phosphorus-containing compounds, yet more preferably phosphates, especially preferably triethyl phosphate;

A7 at least one catalyst;

and a component B whose content of aromatic polyisocyanates is not less than 5% by weight and not more than 70% by weight, comprising B1 at least one aliphatic or cycloaliphatic polyisocyanate component or a combination thereof;

B2 optionally at least one hydrophilized isocyanate, preferably in 3 to 25 parts by weight, preferably in 5 to 15 parts by weight, more preferably in 8 to 12 parts by weight;

B3 greater than or equal to 10 parts by weight and up to 70 parts by weight, preferably up to 50 parts by weight and very particularly preferably up to 40 parts by weight of an aromatic polyisocyanate component, wherein the parts by weight of B3 are based on the sum of the parts by weight of B1 to B3 which are normalized to 100 parts by weight, preferably based on TDI and/or based on co-trimers of TDI and HDI and/or TDI and PDI.

wherein the parts by weight of B2 and B3 are based on the sum of the parts by weight of B1 to B3 which are normalized to 100 parts by weight, characterized in that the reaction of the component A with the component B is performed at an isocyanate index of at least 200, preferably 250 to 600, more preferably 300 to 450, and wherein preferably the reaction mixture is clear before onset of the blowing reaction and has a turbidity of less than 90%, preferably less than 70% and more preferably less than 50% according to DIN EN ISO 7027:2016-11;

and wherein the obtained translucent polyurethane and polyisocyanurate foams have a light transmission according to EN ISO 13468-2:2006 of at least 10%, preferably of at least 14% or 20%, more preferably of at least 10% to 80%, yet more preferably at least 20% to 60%, most preferably of at least 20% to 50% or 55%, in each case measured at a thickness of the foam of 20 mm; and wherein the obtained translucent polyurethane and polyisocyanurate foams have a haze of at least 70%, preferably at least 80%, more preferably at least 90%, yet more preferably at least 98%, most preferably at least 99%, determined according to ASTM D1003-13 and in each case measured at a thickness of the foam of 20 mm.

In a second aspect the invention relates to a process according to aspect 1, characterized in that the obtained translucent polyurethane or polyisocyanurate foam has a thermal conductivity (measured according to DIN 52612:2-1984-06) of less than 100 mW/(m*K), preferably of less than 80 mW/(m*K) and especially preferably of less than 60 mW/(m*K), most preferably of less than 50 mW/(m*K).

In a third aspect the invention relates to a process according to either of the preceding aspects, characterized in that the obtained translucent polyurethane or polyisocyanurate foam has a degree of NCO modification of at least 30 mol %, preferably of 50 to 95 mol % and particularly preferably of 60 to 85 mol %.

The degree of modification is the proportion (in mol %) of all reactive NCO groups present that is involved in a modification reaction, i.e. is ultimately converted into a functional group of the type allophanate or biuret, uretdione, isocyanurate or carbodiimide/uretonimine. The degree of modification and the isocyanurate formation may be influenced through the choice of catalyst, also referred to hereinbelow as a trimerization catalyst. Suitable catalysts are disclosed hereinbelow.

In a fourth aspect the invention relates to a process according to any of the preceding aspects, characterized in that the obtained translucent polyurethane and polyisocyanurate foam is colorless to white and has a yellowing index (measured according to ASTM E 313:2015) of less than 30, preferably less than 20 and particularly preferably of less than 15 in each case based on a thickness of the foam of 20 mm.

In a fifth aspect the invention relates to a process according to any of the preceding aspects, characterized in that the obtained polyurethane or polyisocyanurate foam is in the form of a polyurethane or polyisocyanurate foam having a closed-cell content of at least 40%, preferably at least 50%, more preferably at least 60%. In addition to light transmission the cell size likewise affects thermal conductivity. Thermal conductivity decreases with decreasing cell size and the abovementioned ranges are preferred. Closed-cell content is determined using a polyurethane or polyisocyanurate foam produced in an open vessel or on a plate after cutting in a thickness of preferably >10*the average cell diameter so that the effect of the bisected cells can be neglected. The determination may be carried out according to DIN EN ISO 4590:1986.

In a sixth aspect the invention relates to a process according to any of the preceding aspects, characterized in that the obtained polyurethane or polyisocyanurate foam has an average cell size between 1.0 mm and 20 mm, more preferably between 1.0 mm and 10.0 mm or 1.0 mm and 6.0 mm and particularly preferably between 2.0 mm and 5.0 mm.

Cell size is determined using an optical microscope. Cell size is defined as the greatest distance between two cell edges.

In a seventh aspect the invention relates to a process according to any of the preceding aspects, characterized in that the obtained polyurethane or polyisocyanurate foam has a bulk density of the obtained foam of not more than 300 kg/m$^3$, preferably not more than 200 kg/m$^3$, particularly preferably not more than 100 kg/m$^3$ and very particularly preferably not more than 50 kg/m$^3$ (determined according to DIN EN ISO 845:2009-10).

In an eighth aspect the invention relates to a process according to any of the preceding aspects, characterized in that the obtained polyurethane or polyisocyanurate foam has an average cell wall thickness of at least 0.05 mm, preferably at least 0.1 mm and/or particularly preferably not more than 0.5 mm, more preferably not more than 0.4 mm.

Cell wall thickness is determined using an optical microscope. Cell wall thickness is defined as the thickness of a cell wall centrally between two nodes.

In a ninth aspect the invention relates to a process according to any of the preceding aspects, characterized in that the component A contains:

10 to 99.3 parts by weight, preferably 20 to 90 parts by weight, more preferably 30 to 80 parts by weight, most preferably 50 to 70 parts by weight, of A1;

0 to 10 parts by weight, preferably 0 to 5 parts by weight, most preferably 0 to 2 parts by weight, of A2;

0.1 to 80 parts by weight, preferably 15 to 60 parts by weight, more preferably 25 to 45 parts by weight, of A3;

0.0 to 50 parts by weight, preferably 0.1 to 40 parts by weight, more preferably 0.5 to 30 parts by weight, of A5;

0.0 to 80 parts by weight, preferably 0.1 to 60 parts by weight, more preferably 0.5 to 40 parts by weight, of A6;

wherein the sum of A1 to A7 is 100 parts by weight.

In a tenth aspect the invention relates to a process according to any of the preceding aspects, characterized in that 0.5 to 25 parts by weight, preferably 5 to 20 parts by weight, of A4;

0.1 to 60 parts by weight, preferably 1 to 50 parts by weight, more preferably 2 to 45 parts by weight, most preferably 5 to 35 parts by weight, of A7 are present based on 100 parts by weight made up of the sum of A1 to A7.

In an eleventh aspect the invention relates to a process according to any of the preceding aspects, characterized in that substantially no gaseous nucleating agents incorporated by the mixing process, in particular air, are present during the reaction.

In a twelfth aspect the invention relates to a process according to any of the preceding aspects, characterized in that the curing time is <2 h, preferably <1 h, particularly preferably <30 min and very particularly preferably <15 min and suitable catalysts such as potassium acetate or potassium ethylhexanoate are optionally employed.

In a thirteenth aspect the invention relates to a process according to any of the preceding aspects, characterized in that the mixing is performed in a mixer having a degassing unit connected upstream of it.

In a fourteenth aspect the invention relates to a translucent polyurethane or polyisocyanurate foam obtained by a process according to the preceding aspects.

In a fifteenth aspect the invention relates to a multilayer composite element in which the translucent polyurethane or polyisocyanurate foam according to aspect 14 is arranged between two, preferably translucent or transparent, elements.

In a sixteenth aspect the invention relates to a multilayer composite element according to aspect 15, characterized in that the two, preferably translucent or transparent, elements are films or sheets, particularly preferably made of the materials glass, polymethyl methacrylate or polycarbonate. In a further preferred embodiment both elements are made of different material.

In a seventeenth aspect the invention relates to the use of the translucent polyurethane or polyisocyanurate foam according to aspect 14 or of the multilayer composite element according to aspect 15 or 16 as a constructional element, in particular as a roof element such as a light band, a skylight, as a wall element such as a panel, as a floor element, in buildings, in vehicles or lamps or in combination with recessed lamps as an illumination element, in particular in panel form.

EXAMPLES AND COMPARATIVE EXAMPLES

In what follows the present invention is more particularly elucidated with reference to examples but is in no way limited thereto:

Employed Components:
Trimerization Catalysts:
Desmorapid® 30HB14 (36% by weight potassium formate, 64% by weight ethylene glycol)
Catalysts
Dimethyltin neodecanoate (Formrez UL-28)
Employed Polyols A):
Ethylene glycol
Polyether V531 (hydroxyl number 550 mg KOH/g, 100% prim. OH groups, functionality 3)
Employed Flame Retardants:
Triethyl phosphate (TEP)
Tris(2-chloroisopropyl) phosphate (TCPP)
Foam Stabilizers (Polyether-Polydimethylsiloxane Copolymers):
Tegostab® B8490
Employed Isocyanates and Polyisocyanates B)
Desmodur® N3600: Isocyanurate-containing polyisocyanate based on 1,6-diisocyanatohexane (HDI) having an NCO content of 23.2% by weight, an average NCO functionality of 3.2 (according to GPC), a content of monomeric HDI of not more than 0.2% by weight and a viscosity of 1200 mPas (23° C.)
Desmodur® N3200: Biuret-containing polyisocyanate based on 1,6-diisocyanatohexane (HDI) having an NCO content of 23.0% by weight, a content of monomeric HDI of not more than 0.4% by weight and a viscosity of 5380 mPas (20° C.)
Bayhydur® 3100: Hydrophilic isocyanurate-containing polyisocyanate based on 1,6-diisocyanatohexane (HDI) having an NCO content of 17.4% by weight, an average NCO functionality of 3.2 (according to GPC), a content of monomeric HDI of not more than 0.1% by weight and a viscosity of 2800 mPas (23° C.)
Desmodur HL: Isocyanurate-containing polyisocyanate (37.5% by weight) based on 1,6-diisocyanatohexane (HDI) and 2,4-toluene diisocyanate having an NCO content of 24.4% by weight (calculated), dissolved in 62.5% by weight of Desmodur® N3600. The mixture has a viscosity of about 53 000 mPas (23° C.).

EXAMPLES

Example 1

An isocyanate-reactive composition composed of 1.30 g of ethylene glycol, 1.04 g of water, 1.20 g of foam stabilizer Tegostab B8490, 2.40 g of catalyst Desmorapid® 30HB14 and 0.90 g of catalyst Formrez UL-28 was mixed with an isocyanate mixture composed of 38.21 g of Desmodur® HL dissolved in 63.64 g of Desmodur® N3600, 11.30 g of Bayhydur® 3100 at 3540 rpm for 15 seconds with a Speedmixer in a virtually bubble-free manner and carefully poured into a mold. The mold was then placed in an oven at 70° C. The foam had set after 110 seconds. The foam was then heat-treated in an oven at 70° C. for a further 30 minutes.

The calculated index is 300.

The foam had a light transmission of 17.2% (thickness 20 mm).

The cell size was about 1.0 to 3.0 mm.

Example 2

An isocyanate-reactive composition composed of 1.04 g of ethylene glycol, 0.84 g of water, 1.10 g of foam stabilizer Tegostab B8490, 2.20 g of catalyst Desmorapid® 30HB14, 0.82 g of catalyst Formrez UL-28 and 10.0 g of triethyl phosphate was mixed with an isocyanate mixture composed of 15.92 g of Desmodur® HL dissolved in 26.53 g of Desmodur® N3600, 42.44 g of further Desmodur® N3600, 9.42 g of Bayhydur® 3100 at 3540 rpm for 15 seconds with a Speedmixer in a virtually bubble-free manner and carefully poured into a mold. The mold was then placed in an oven at 70° C. The foam had set after 240 seconds. The foam was then heat-treated in an oven at 70° C. for a further 60 minutes.

The calculated index is 300.

The foam had a light transmission of 25.2% (thickness 20 mm).

The cell size was about 2.0 to 4.0 mm.

Example 3

An isocyanate-reactive composition composed of 1.05 g of ethylene glycol, 0.85 g of water, 0.79 g of foam stabilizer Tegostab B8490, 0.34 g of catalyst Desmorapid® 30HB14, 0.11 g of catalyst Formrez UL-28 and 9.73 g of triethyl phosphate was mixed with an isocyanate mixture composed of 22.00 g of Desmodur® T100, 68.00 g of Desmodur® N3600 and 10.00 g of Bayhydur® 3100 at 3540 rpm for 15 seconds with a Speedmixer in a virtually bubble-free manner and carefully poured into a mold. The mold was then placed in an oven at 70° C. The foam had set after 600 seconds. The foam was then heat-treated in an oven at 70° C. for a further 60 minutes.

The calculated index is 500.

The foam had a light transmission of 14.8% (thickness 20 mm).

The cell size was about 2.0 to 4.0 mm.

Example 4

An isocyanate-reactive composition composed of 3.12 g of ethylene glycol, 0.21 g of water, 1.58 g of foam stabilizer Tegostab B8490, 1.58 g of catalyst potassium acetate and 0.78 g of catalyst Formrez UL-28 was mixed with an isocyanate/c-pentane mixture composed of 90.00 g of Desmodur® N3600, 10.00 g of Desmodur® N3200 and 3.09 g of cyclopentane at 2000 rpm for 30 seconds with a Speedmixer in a virtually bubble-free manner and carefully poured into a mold.

The mold was then placed in an oven at 70° C. The foam had set within a tack-free time of 120 seconds. The foam was then heat-treated in an oven at 70° C. for a further 120 minutes.

The calculated index is 426.

The foam had a light transmission of 28% (thickness 20 mm).

Example 5

An isocyanate-reactive composition composed of 2.13 g of ethylene glycol, 0.21 g of water, 1.05 g of foam stabilizer Tegostab B8490, 1.05 g of catalyst potassium acetate and 1.05 g of catalyst Formrez UL-28 was mixed with an isocyanate/c-pentane mixture composed of 25.92 g of Desmodur® HL, 64.10 g of Desmodur® N3600, 10.25 g of Bayhydur® 3100 and 3.09 g of cyclopentane at 2000 rpm for 30 seconds with a Speedmixer in a virtually bubble-free manner and carefully poured into a mold. The mold was then placed in an oven at 70° C. The foam had set within a tack-free time of 120 seconds. The foam was then heat-treated in an oven at 70° C. for a further 120 minutes.

The calculated index is 590.

The foam had a light transmission of 18% (thickness 20 mm).

Example 6

An isocyanate-reactive composition composed of 2.17 g of ethylene glycol, 2.17 g of polyether V531, 0.24 g of water, 13.05 g of flame retardant TCPP, 8.70 g of flame retardant TEP, 1.44 g of foam stabilizer Tegostab B8490, 3.46 g of catalyst potassium 2-ethylhexanoate, 0.29 g of catalyst Formrez UL-28 and 1.73 g of tetramethylguanidine was mixed with an isocyanate/c-pentane mixture composed of 73.79 g of Desmodur® N3600, 4.10 g of Bayhydur® 3100, 4.10 g of Desmodur® N3200 and 4.8 g of cyclopentane at 2000 rpm for 30 seconds with a Speedmixer in a virtually bubble-free manner and carefully poured into a mold. The mold was then placed in an oven at 70° C. The foam had a tack-free time of 3 minutes. The foam was then heat-treated in an oven at 70° C. for a further 120 minutes.

The calculated index is 300.

The foam had a light transmission of 15% (thickness 20 mm).

Comparative Example 1

An isocyanate-reactive composition composed of 1.30 g of ethylene glycol, 1.04 g of water, 1.20 g of foam stabilizer Tegostab B8490, 2.40 g of catalyst Desmorapid® 30HB14 and 0.90 g of catalyst Formrez UL-28 was mixed with an isocyanate mixture composed of 38.21 g of Desmodur® HL dissolved in 63.64 g of Desmodur® N3600, 11.30 g of Bayhydur® 3100 at 3730 rpm for 15 seconds with a Pendraulik stirrer (largely bubble-free manner) and the reaction mixture was carefully poured into a mold. The mold was then placed in an oven at 70° C. The foam had set after 90 seconds. The foam was then heat-treated in an oven at 70° C. for a further 15 minutes.

The calculated index is 300.

The foam had a light transmission of 3.5% (thickness 20 mm).

The cell size was about 0.5 to 1.5 mm.

Comparative Example 2

An isocyanate-reactive composition composed of 1.08 g of ethylene glycol, 0.87 g of water, 1.14 g of foam stabilizer Tegostab B8490, 0.57 g of catalyst Desmorapid® 30HB14, 0.28 g of catalyst Formrez UL-28 and 10.0 g of triethyl phosphate was mixed with an isocyanate mixture composed of 30.00 g of Desmodur® T100, 60.00 g of Desmodur® N3600 and 10.00 g of Bayhydur® 3100 at 3730 rpm for 15 seconds with a Pendraulik stirrer (largely bubble-free manner) and the reaction mixture was carefully poured into a mold. The mold was then placed in an oven at 70° C. The foam had set after 90 seconds. The foam was then heat-treated in an oven at 70° C. for a further 15 minutes.

The calculated index is 500.

The foam had a light transmission of 2.5% (thickness 20 mm).

The cell size is <1.5 mm.

Comparative Example 3

An isocyanate-reactive composition composed of 2.13 g of ethylene glycol, 1.05 g of foam stabilizer Tegostab B8490, 1.05 g of catalyst potassium acetate and 0.52 g of catalyst Formrez UL-28 was mixed with an isocyanate/c-pentane mixture composed of 90.00 g of Desmodur® N3600, 10.00 g of Bayhydur® 3100 and 3.09 g of cyclopentane at 2000 rpm for 30 seconds with a Speedmixer in a virtually bubble-free manner and carefully poured into a mold. The mold was then placed in an oven at 70° C. No foam was formed.

The calculated index is 800.

Methods of Measurement Used:

The coefficients of thermal conductivity were determined according to DIN 52616: 1977-11 using foams having a thickness of 30 mm.

Light transmission was determined according to EN ISO 13468-2:2006 using foams having a thickness of 20 mm unless a different thickness is explicitly specified.

Cell size and cell wall thickness were measured as described hereinabove using an optical microscope.

The yellowing index, also referred to hereinbelow merely as YI, was determined according to ASTM E 313:2015.

Haze was determined according to ASTM D1003-13.

The invention claimed is:

1. A process for producing translucent polyurethane or polyisocyanurate foams comprising reacting a component A with a component B:
   A1 at least one polyol reactive with the component B;
   A2 optionally at least one amine;
   A3 water and optionally formic acid or at least one blowing agent or mixtures thereof;
   A4 at least one foam stabilizer
   A5 optionally auxiliary or additive substances;
   A6 optionally at least one flame retardant;
   A7 at least one catalyst;
   and wherein component B has a content of aromatic polyisocyanates of not less than 5% by weight and not more than 70% by weight, comprising
   B1 at least one aliphatic or cycloaliphatic polyisocyanate component or a combination thereof; and
   B2 optionally at least one hydrophilized isocyanate; and
   B3 greater than or equal to 10 parts by weight and up to 70 parts by weight of an aromatic polyisocyanate component, wherein the parts by weight of B3 are based on the sum of the parts by weight of B1 to B3 which are normalized to 100 parts by weight,
   wherein
   the reaction of the component A with the component B is performed at an isocyanate index of at least 200
   wherein substantially no gaseous nucleating agents introduced by the mixing process are present during the reaction, and
   wherein the translucent polyurethane or polyisocyanurate foams obtained have a light transmission according to EN ISO 13468-2:2006 of at least 10% and a haze of at least 70% determined according to ASTM D1003-13 in each case measured at a thickness of 20 mm.

2. The process as claimed in claim 1, wherein the translucent polyurethane or polyisocyanurate foam has a thermal conductivity measured according to DIN 52612:2-1984-06 of less than 100 mW/(m*K).

3. The process as claimed in claim 1, wherein the translucent polyurethane or polyisocyanurate foam has a degree of NCO modification of at least 30 mol %.

4. The process as claimed in claim 1, wherein the translucent polyurethane or polyisocyanurate foam is colorless to white and has a yellowing index measured according to ASTM E 313:2015 of less than 30 based on a thickness of the foam of 20 mm.

5. The process as claimed in claim 1, wherein the polyurethane or polyisocyanurate foam is in the form of a polyurethane or polyisocyanurate foam having a closed-cell content of at least 40%.

6. The process as claimed in claim 1, wherein the polyurethane or polyisocyanurate foam has an average cell size between 1 mm and 20 mm determined using an optical microscope, wherein cell size is defined as the greatest distance between two cell edges.

7. The process as claimed in claim 1, wherein the polyurethane or polyisocyanurate foam has a bulk density of the obtained foam of not more than 300 kg/m$^3$ determined according to DIN EN ISO 845:2009-10.

8. The process as claimed in claim 1, wherein the polyurethane or polyisocyanurate foam has an average cell wall thickness of at least 0.05 mm determined using an optical microscope, wherein cell wall thickness is defined as the thickness of a cell wall centrally between two nodes.

9. The process as claimed in claim 1, wherein component A contains
   10 to 99.3 parts by weight of A1;
   0 to 10 parts by weight of A2;
   0.1 to 80 parts by weight of A3;
   0 to 50 parts by weight of A5;
   0 to 80 parts by weight of A6;
   wherein the sum of A1 to A7 is 100 parts by weight.

10. The process as claimed in claim 1, wherein
    0.5 to 25 parts by weight of A4;
    0.1 to 60 parts by weight of A7 are present based on 100 parts by weight made up of the sum of A1 to A7.

11. The process as claimed in claim 1, wherein the polyisocyanate component B has a content of urethane groups of not more than 5% by weight based on the weight of B.

12. A translucent polyurethane or polyisocyanurate foam obtained by the process of claim 1.

13. A multilayer composite element comprising at least two elements, and the translucent polyurethane or polyisocyanurate foam as claimed in claim 12 arranged between the at least two elements.

14. The multilayer composite element as claimed in claim 13, wherein the two elements are transparent films or sheets.

15. A method comprising utilizing the translucent polyurethane or polyisocyanurate foam as claimed in claim 12 as a constructional element, as a wall element, as a floor element, in buildings, in vehicles or lamps or in combination with recessed lamps as an illumination element.

* * * * *